United States Patent
Igari et al.

(10) Patent No.: US 6,523,142 B1
(45) Date of Patent: Feb. 18, 2003

(54) APPARATUS AND METHOD OF PERFORMING IN A DISK DRIVE COMMANDS ISSUED FROM A HOST SYSTEM

(75) Inventors: Fubito Igari, Hamura (JP); Yutaka Arakawa, Hamura (JP); Hiroshi Suzuki, Kokubunji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/386,419

(22) Filed: Aug. 31, 1999

(30) Foreign Application Priority Data

Jan. 6, 1999 (JP) ............................................ 11-001474

(51) Int. Cl.$^7$ ................................................ G06F 11/00
(52) U.S. Cl. ........................................ 714/55; 711/114
(58) Field of Search ............................ 714/55, 56, 54, 714/51, 48, 47, 43, 44, 39, 25, 814, 815; 711/112, 114

(56) References Cited

U.S. PATENT DOCUMENTS

| | | | |
|---|---|---|---|
| 5,287,363 A | 2/1994 | Wolf et al. ................. | 371/21.1 |
| 5,526,507 A | 6/1996 | Hill ............................. | 395/441 |
| 5,758,188 A * | 5/1998 | Appelbaum et al. ........ | 395/855 |
| 5,761,526 A * | 6/1998 | Sakakura et al. ........... | 395/821 |
| 5,812,761 A | 9/1998 | Seki et al. ............. | 395/185.07 |
| 5,903,509 A * | 5/1999 | Ryan et al. ............ | 365/230.03 |
| 6,085,277 A * | 7/2000 | Nordstrom et al. ......... | 710/263 |
| 6,145,052 A * | 11/2000 | Howe et al. ................ | 711/113 |
| 6,175,883 B1 * | 1/2001 | Kvamme et al. ............. | 710/22 |

* cited by examiner

Primary Examiner—Nadeem Iqbal
(74) Attorney, Agent, or Firm—Pillsbury Winthrop LLP

(57) ABSTRACT

Disclosed herein is a system for controlling the process of performing a command in an HDD. The HDD comprises a register for holding the command control information supplied from a host system, a command register for holding a specific command. The HDD further comprises a CPU. The CPU fetches the command control information from the register when the specific command held in the command register is one for setting the command control information. The CPU controls the process of performing a command in accordance with the command control information, thereby to finish performing the command within a period between the time when the host system issued the command and the time when the host system issues the next command.

20 Claims, 13 Drawing Sheets

| REGISTERS | CONTENTS |
|---|---|
| 9A — COMMAND | 9C |
| 9B — CYLINDER | 0~0FFFFh(TRANSFER RATE KB/S) |
| 9C — DRIVE/HEAD | DRIVE NUMBER |
| 9D — SECTOR NO. | 0 |
| 9E — SECTOR COUNT | 0 |

| REGISTERS | CONTENTS |
|---|---|
| 9A — COMMAND | 9D |
| 9B — CYLINDER | 0~0FFFFh(LIMIT TIME ms) |
| 9C — DRIVE/HEAD | DRIVE NUMBER |
| 9D — SECTOR NO. | 0 |
| 9E — SECTOR COUNT | 0 |

| REGISTERS | CONTENTS |
|---|---|
| 9A — COMMAND | 9E |
| 9B — CYLINDER | 0 |
| 9C — DRIVE/HEAD | DRIVE NUMBER |
| 9D — SECTOR NO. | 0 |
| 9E — SECTOR COUNT | 0 |

FIG. 13

| REGISTERS | CONTENTS |
|---|---|
| 9A — COMMAND | 9F |
| 9B — CYLINDER | 0 |
| 9C — DRIVE/HEAD | DRIVE NUMBER |
| 9D — SECTOR NO. | 0 |
| 9E — SECTOR COUNT | 0 |

FIG. 14

| REGISTERS | CONTENTS |
|---|---|
| 9A — COMMAND | A0 |
| 9B — CYLINDER | 0 |
| 9C — DRIVE/HEAD | DRIVE NUMBER |
| 9D — SECTOR NO. | 0 |
| 9E — SECTOR COUNT | 0 |

| REGISTERS | CONTENTS |
|---|---|
| 9A — COMMAND | A1 |
| 9B — CYLINDER | 0 |
| 9C — DRIVE/HEAD | DRIVE NUMBER |
| 9D — SECTOR NO. | 0 |
| 9E — SECTOR COUNT | 0 |

FIG. 17

| REGISTERS | CONTENTS |
|---|---|
| 9A — COMMAND | A2 |
| 9B — CYLINDER | 0 |
| 9C — DRIVE/HEAD | DRIVE NUMBER |
| 9D — SECTOR NO. | 0 |
| 9E — SECTOR COUNT | 0 |

FIG. 18

| REGISTERS | CONTENTS |
|---|---|
| 9A — COMMAND | A3 |
| 9B — CYLINDER | 0 |
| 9C — DRIVE/HEAD | DRIVE NUMBER |
| 9D — SECTOR NO. | 0 |
| 9E — SECTOR COUNT | 0 |

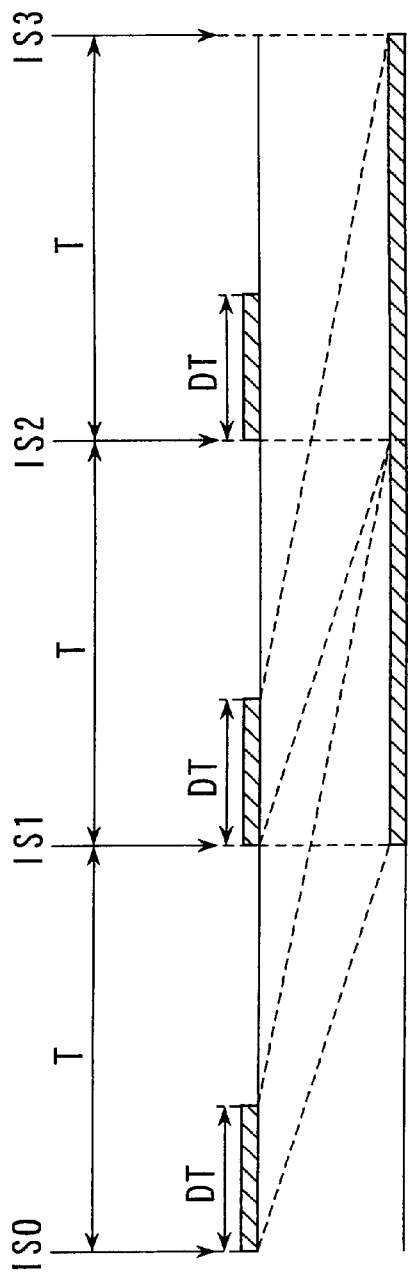
FIG. 22A PRIOR ART
FIG. 22B PRIOR ART
FIG. 22C PRIOR ART
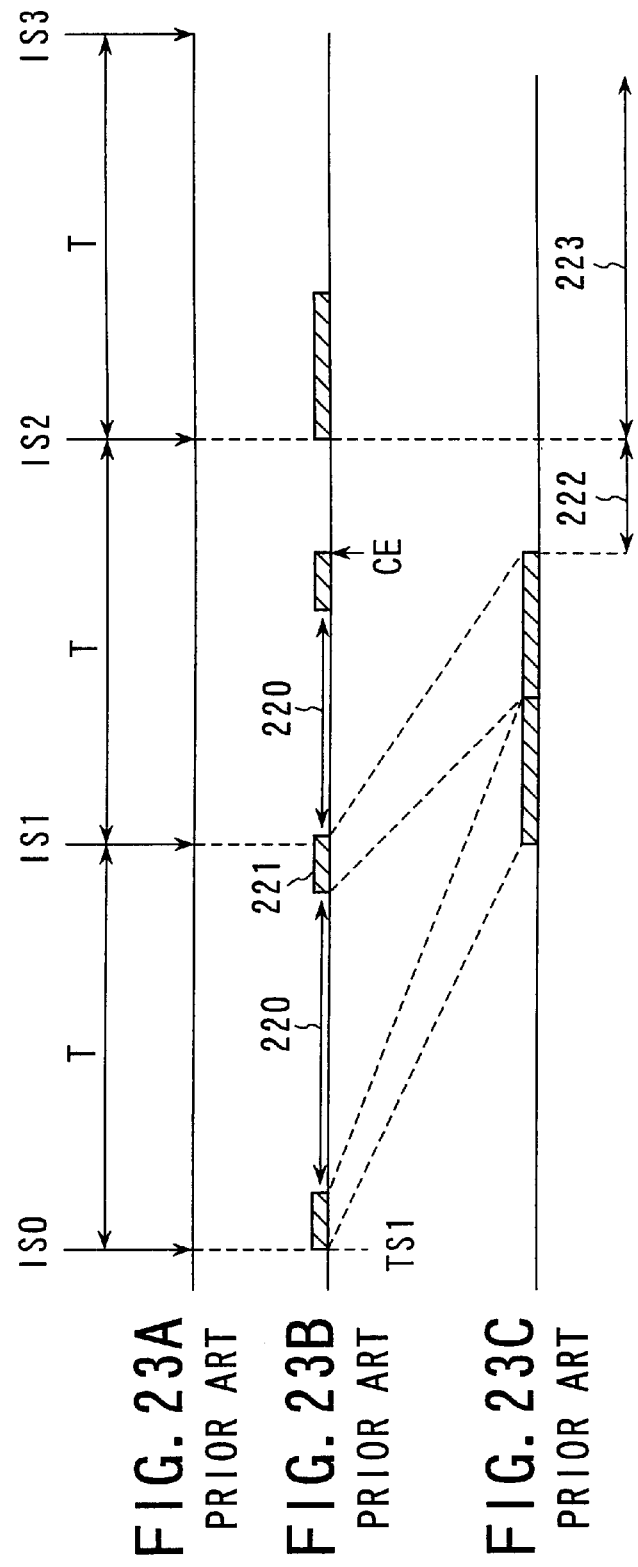
FIG. 23A PRIOR ART
FIG. 23B PRIOR ART
FIG. 23C PRIOR ART

APPARATUS AND METHOD OF PERFORMING IN A DISK DRIVE COMMANDS ISSUED FROM A HOST SYSTEM

BACKGROUND OF THE INVENTION

The present invention relates to a disk drive such as a hard disk drive, and also a method of performing, in a disk drive, commands issued from a host system.

A hard disk drive (HDD) has a head, an encoder and a decoder. The head can write data on a disk-shaped recording medium (hereinafter referred to as "disk") in accordance with a write command supplied from a host system (e.g., a digital apparatus such as a personal computer). The head can read data from the disk in accordance with a read command supplied from the host system. To enable the head to write data on the disk, the encoder converts the data transferred from the host system, to write data than can be magnetically recorded on the disk. In the data-reading operation, the decoder decodes the data read by the head from the disk, to the original data.

The HDD comprises a disk controller (HDC) and a buffer memory (i.e., a DRAM). The HDC has a host interface for controlling the transfer of the write command, the read command, the write data (i.e., data to be written on the disk), and the read data (i.e., data read from the disk), between the HDD and the host system. The HDC controls the buffer memory, which is also known as "sector buffer." Controlled by the HDC, the buffer memory temporarily stores the write data transferred from the host system or the read data output from the decoder.

In the data-reading operation, the HDC starts transferring the read data when the sector buffer accumulates a predetermined amount of data (usually, one sector of data). For example, an HDC having an IDE (Intelligent Drive Electronics) interface starts transferring the read data when the sector buffer accumulates at least 512 bytes of data, which is one sector of data. The HDC has a sector counter that detects the amount of data stored in the sector buffer. The count of the sector counter increases by one every time one sector of data (i.e., 512 bytes) is read from the disk and stored into the sector buffer.

Usually, the data-transferring speed at which data is read from the disk and store it into the sector buffer is lower than the speed at which data is read from the sector buffer and transfer it to the host system. Hence, when one sector of data is transferred from the sector buffer to the host system, the next sector of data to be transferred to the host system may not be stored into the sector buffer. If this happens, the host system needs to wait until the next sector of data is stored into the sector buffer in the HDD.

In recent years, HDDs are used not only in computers, but also as digital media for recording digital data such as audio data and video data (including still pictures). Digital data is continuous data, such as a stream of images, and is processed in large units. An HDD must therefore read a prescribed amount of data from the disk and transfer it to the host system within a predetermined time during the data-reproducing operation. The host system processes, for example, video data transferred from the HDD, so that the data may be displayed on the screen of a display. Generally, the speed of processing the data transferred from the HDD is lower than the speed of transferring the data from the HDD to the host system.

Assume that the host system issues a read command to the HDC provided in the HDD, at regular intervals T, or at time IS0, time IS1, time IS2 and time IS3, as is illustrated in FIG. 22A. In response to the read command, the HDC transfers the desired read data to the host system for a time DT as shown in FIG. 22B, in response to the read command. In most cases, the desired data is stored in the sector buffer, and the HDC reads the transmits the data from the sector buffer and transfers it to the host system. If the desired data is not stored in the sector buffer, the HDC reads the desired data from the disk, stores it into the sector buffer, and transfers it from the sector buffer to the host system. The host system processes the desired data (so as to display images represented by the data). Until the host system receives all desired data, it keeps issuing the read command repeatedly and processing the parts of the desired data, as is illustrated in FIG. 22C.

During the data-reading operation, a read error may occur while the head (i.e., read head) is reading data from the disk. In this case, the head reads again the data recorded from that sector of the disk, where the read error has taken place. (Namely, read retry is carried out.) The read retry is repeated a predetermined number of times (e.g., at most 30 times). Therefore, it usually takes much time to read the data from the sector where the read error has occurred.

The process of transferring data, in which the read retry must be performed, will be explained with reference to FIGS. 23A to 23C. Assume that the host system issues a read command at time IS0 as is shown in FIG. 23A. In response to the read command the HDC starts transferring data at time TS1, as is illustrated in FIG. 23B.

The data which the host system has requested for is not stored in the sector buffer, and the data may therefore be read from the disk. Assume that an error occurs in, for example, the second sector of the disk during the data-reading operation, and that data is read from the disk after the read retry has been repeated 30 times at each sector of the disk. Then, the transfer of data is interrupted for a period 220 as shown in FIG. 23B, between the time the first data is transferred in response to the read command issued at time IS0 and the next data 221 is transferred.

In the HDD, once the first read retry has failed at any sector of the disk, the second read retry cannot be effected until the disk rotates about 360° when that sector moves again to the read head. Assume that the disk is rotating at 4200 rpm, and that the host system issues a read command at intervals T of 50 ms. Hence, about 42 ms is required to perform the read retry 30 times at the sector where the read error has occurred. This period of time is shorter than the command-issuing interval T (50 ms). Should a read error take place at another sector, another 42 ms period is required for the read try.

If read errors take place at two sectors, the first read command issued at time IS0 is not performed at time IS1 when the host system must issue the second read command. In other words, the HDD has not transferred the data 221 to the host system in response to the first read command, even at time IS1 when the host system needs to issue the second read command. Hence, the host system cannot issue the second read command at time IS1. At time IS1 at which the host system should issue the second read command, the host system is processing the data the HDD transferred in response to the first read command, as is illustrated in FIG. 23C. After the host system finishes processing the data, it will process no data for periods 222 and 223. This is because it has not issue the second read command to the HDD and, hence, the HDD cannot read data to transfer to the host system. Such interruption of data processing in the host system takes place particularly when the host system processes video data that must be processed continuously.

As described above, when a read error occurs while the HDD is transferring data to the host system in response to the read commands issued by the host system has at regular intervals, the transfer of the data is interrupted. Consequently, the data processing in the host system is interrupted, and the data output from the host system is incomplete if the data processed by the host system is continuous data, such as a stream of images. In short, the conventional HDD requires much more time to perform a command when an error (particularly, a read error) occurs than when no errors occur at all.

To solve this problem, a system has been proposed which limits the time the HDD needs to transfer files from the HDD to the host system, thereby to minimizing the delay in the data processing performed in the host system. In this system, it is the host system that limits the time. However, the host system cannot accomplish normal data processing even if the time the HDD requires to perform a command is shortened.

BRIEF SUMMARY OF THE INVENTION

The object of the present invention is to a disk drive which can perform a command issued by a host system before the host system issue the next command, thereby enabling the host system to effect normal data processing.

According to an aspect of the invention, there is provided a magnetic disk drive which reads data from, and writes data on, a disk in accordance with commands issued from a host system. The disk drive comprises means for setting command control information that limits the time for performing a command, and control means for controlling the process of performing the command, in accordance with the command control information, within the period between the time when the host system issued the command and the time when the host system will issues the next command.

More precisely, the command control information defines the average data transfer speed calculated from the amount of data transferred as the command is performed. The control means controls the process of performing the command, thereby to transfer data at a speed equal to or lower than the average data transfer speed.

The command control information also defines an upper limit of the time for performing the command, which is based on the amount of data transferred as the command is performed. The control means controls the process of performing a plurality of commands continuously, thereby to finish performing each command within the upper limit of the time for performing the command.

Further, the control means can supplies an error message to the host system if the process of performing any command does not complete within the period between the time when the host system issued the command and the time when the host system will issues the next command.

According to another aspect of the invention, there is provided a magnetic disk drive which reads data from, and writes data on, a disk in accordance with commands issued from a host system, and which performs read retry when a read error occurs while data is being read from the disk. This disk drive comprises means for limiting the number of times the read retry can be repeated when a command cannot be performed within the period between the time when the host system issued the command and the time when the host system will issues the next command.

With the present invention it is possible to finish transferring data to the host system, within a period between the issuance of one command and the issuance of the next command. Therefore, the host system can receive continuous data such as video data, without interruption, and can therefore reproduce data within a predetermined time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a diagram explaining the process of complementing data;

FIGS. 11 to 18 are diagrams, each showing the data stored in the registers, which serves to perform a command in a modification of the disk drive;

FIGS. 22A to 22C are a timing chart explaining the process of performing a command in a conventional disk drive; and FIGS. 23A to 23C are a timing chart explaining the problem with the process of performing a command in the conventional disk drive.

DETAILED DESCRIPTION OF THE INVENTION

Embodiments of the present invention will be described, with reference to the accompanying drawings.

(Disk Drive)

Figure 1:
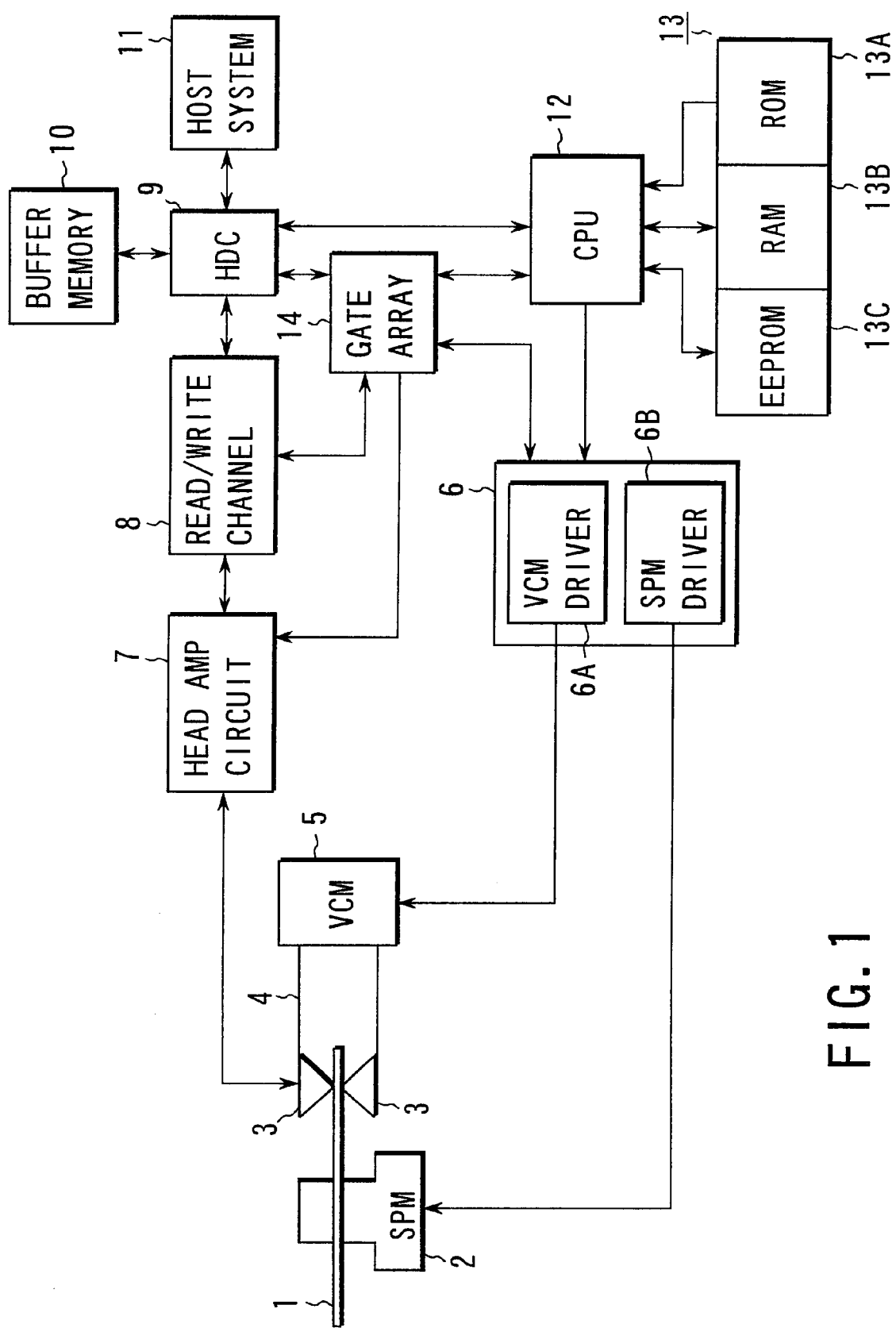
FIG. 1 is a block diagram showing the major components of a disk drive according to the invention.

FIG. 1 shows a disk drive according to this invention. As can be understood from FIG. 1, the disk drive is a hard disk drive (HDD). The HDD comprises four major components, which are a disk 1, a head unit, a signal-processing system, and a control system. The disk 1 is a data recording medium. The head unit writes data on the disk 1 and reads the data from the disk 1. The signal-processing system processes data signals to be written on the disk 1 and the data signals read from the disk 1. The control system controls the other components of the HDD.

The HDD further comprises a spindle motor (SPM) 2 and an actuator 4. The SPM 2 rotates the disk 1. The head unit comprises a slider, a write head, and a read head 3. Both the write head and the read head 3 are mounted on the slider. The head unit is mounted on the actuator 4.

Figure 2:
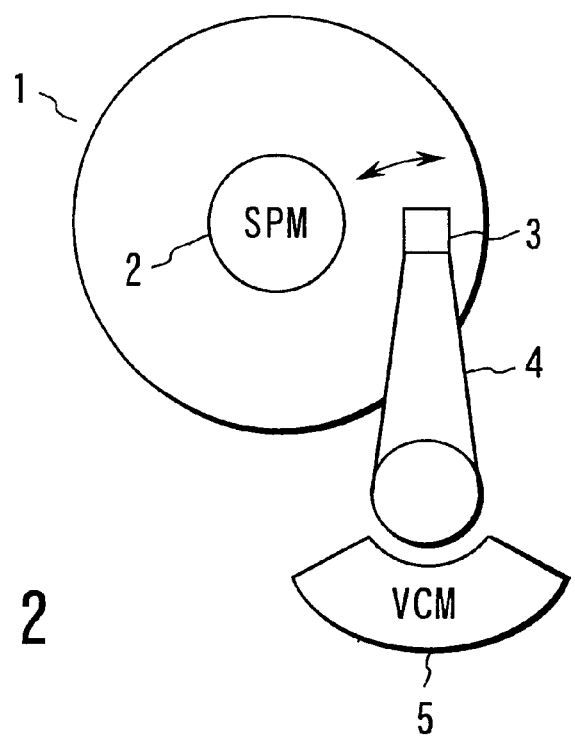
FIG. 2 is a diagram illustrating the head/disk assembly of the disk drive.

As shown in FIG. 2, the actuator 4 is rotated in the radial direction of the disk 1 by means of a voice coil motor (VCM) 5. The VCM 5 is driven by a drive current that is supplied from a VCM driver 6A under the control of a CPU 12 (later described). The SPM 2 is driven by a drive current supplied from a SPM driver 6B. The VCM driver 6A and the SPM driver 6B are incorporated in a one-chip driver IC 6. The drivers 6A and 6B receive digital control values from the CPU 12 through a gate-array circuit 14. In accordance with the digital control values, the drivers 6A and 6B generate drive currents, which are supplied respectively to the VCM 5 and the SPM 2.

The signal-processing system has a head amplifier circuit 7 and a read/write channel 8. The head amplifier circuit 7 amplifies the read signal the read head 3 has read from the disk 1, and supplies the read signal to the read/write channel 8. The head amplifier circuit 7 receives the write signal (i.e., encoded data) that the read/write channel 8 has processed, converts the write signal to a current, and supplies the current to the write head. The read/write channel 8 has an encoder and a decoder. The encoder receives the write data supplied from a host system 11 and converts the write data to encoded data. The decoder receives the signal read by the read head 3 and convert the signal to the original data.

Figure 3:
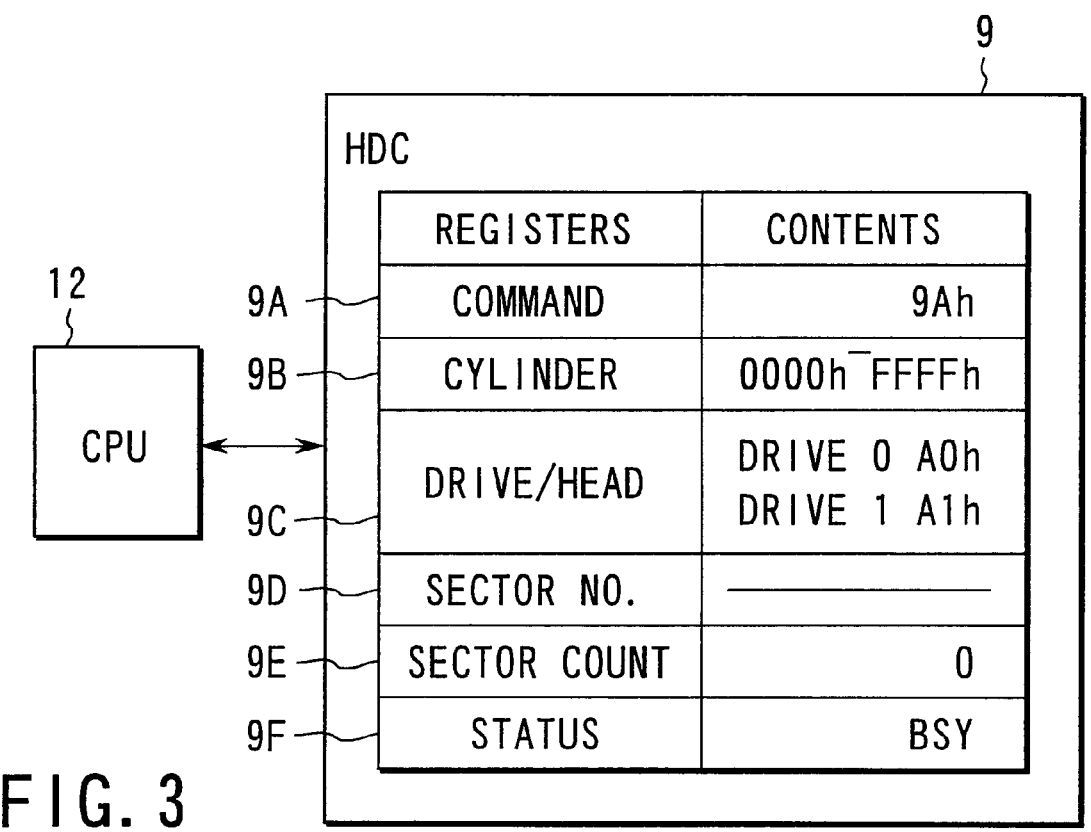
FIG. 3 is a diagram illustrating the data stored in the registers, which serves to perform a command in the disk drive.

The control system has an HDC 9, the microcontroller (CPU) 12, and the gate-array circuit 14. The HDC 9 controls a buffer memory 10, which will be hereinafter called "sector buffer," thus controlling the transfer of data between the HDD and the host system 11. As shown in FIG. 3, the HDC 9 has registers for storing various data items, which are used to perform a command as will be described later. The CPU 12 is the main control device in the HDD, or a major component of the embodiment of the invention. The CPU 12 controls a command and conducts various controls (including the positioning of the head unit), in accordance with the control program stored in a ROM 13A. The ROM 13A is one of the three memories constituting an IC memory unit 13. The remaining two memories of the unit 13 are a RAM 13B and an EEPROM (Electrically Programmable ROM) 13C. The gate-array circuit 14 functions as an interface control circuit that receives control signals from the CPU 12 and outputs the same thereto. The circuit 14 also receives servo data from the read/write channel 8 and outputs the same thereto.
(Control of the Command)

The various controls of a command, which are effected in the present embodiment, will be explained, one by one.
(Setting of the Limit Time for Performing the Command)

The HDC 9, which accords with IDE (Intelligent Drive Electronics) specification, has various registers 9A to 9F as shown in FIG. 3. The registers 9A to 9F are indispensable to perform a command. They are: a command register 9A, a cylinder number register 9B, a drive/head register 9C, a sector number register 9D, a sector count register 9E, and a status register 9F. Data can be written from the host system 11 into all registers, except the status register 9F. The CPU 12 can refer the control information stored in the registers 9A to 9F and write control information into them. The data stored in the command register 9A and cylinder number registers (hereinafter referred to as "cylinder register") 9B shall be called "command control information."

In the present embodiment, a time within which a command must be performed (hereinafter referred to as "limit time") is set when a command code (9A$h$) is stored into the command register 9A. More precisely, the data representing the limit time is set in the cylinder register 9B in milliseconds.

Figure 4:
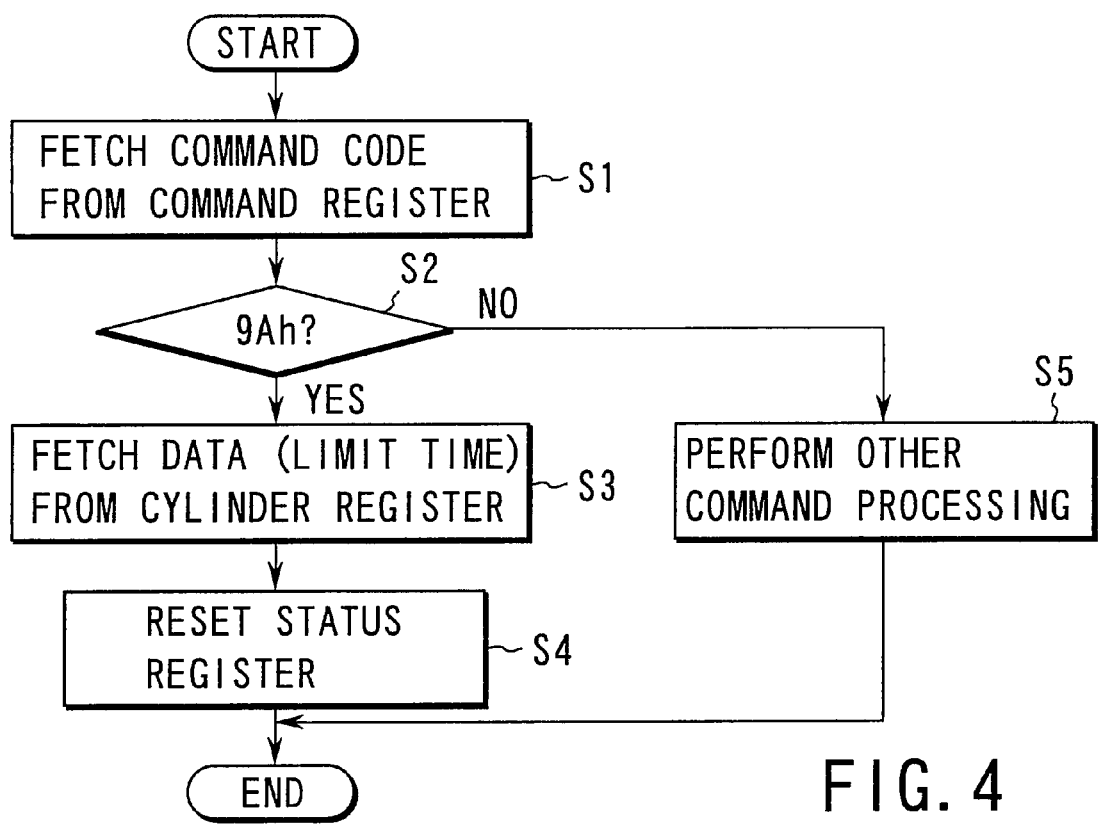
FIG. 4 is a flow chart explaining the process of setting a limit time within which a command must be performed in the disk drive.

How the limit time, an item of command control information, is set in the cylinder register 9B will be explained with reference to the flow chart of FIG. 4.

When the host system 11 issues a command, a command code is stored into the command register 9A. The CPU 12 fetches the command code from the command register 9A (Step S1). The CPU 12 determines whether or not the command code is the code 9A$h$ for setting a limit time (Step S2). If NO in Step S2, the flow goes to Step S5, in which another command will be performed.

If YES in Step S2, that is, if the command code is 9A$h$, the flow goes to Step S3. In Step S3, the CPU 12 fetches the limit time data from the cylinder register 9B and stores the same into the RAM 13B or the EEPROM 13C. In this case, the CPU 12 may access the disk 1, thereby to record the limit time data in a prescribed sector area. The CPU 12 then resets the status register 9F, clearing the BSY bit and informing the host system 11 that the command has been performed (Step S4). (If necessary, the CPU 12 may process an interrupt bit.) The limit time, i.e., the time within which each command must be performed, is thereby set in the HDD.
(Setting of Prescribed Average Speed of Transferring Data)

Figure 5:
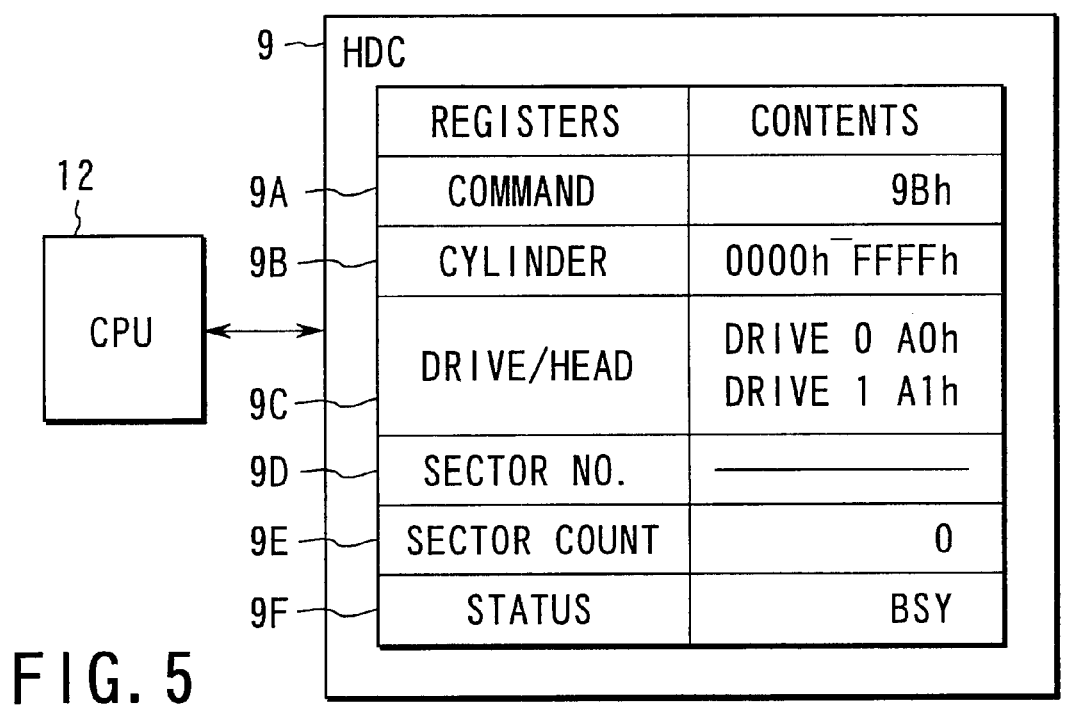
FIG. 5 is a diagram depicting the data stored in the registers, which serves to perform a command in the disk drive.

How a prescribed average speed of transferring data, another item of the command control information, is set will be explained with reference to FIGS. 5 and 6.

A command for setting the prescribed average speed of transferring data (hereinafter called "average-speed data") is a code 9B$h$. To set the average-speed data, the host system 11 issues the command 9B$h$ to the HDD. In the HDD, the command 9B$h$ is stored into the command register 9A of the HDC 9 as is illustrated in FIG. 5. The average-speed data is stored in the register 9A in units of, for example, 1 KB/sec.

Figure 6:
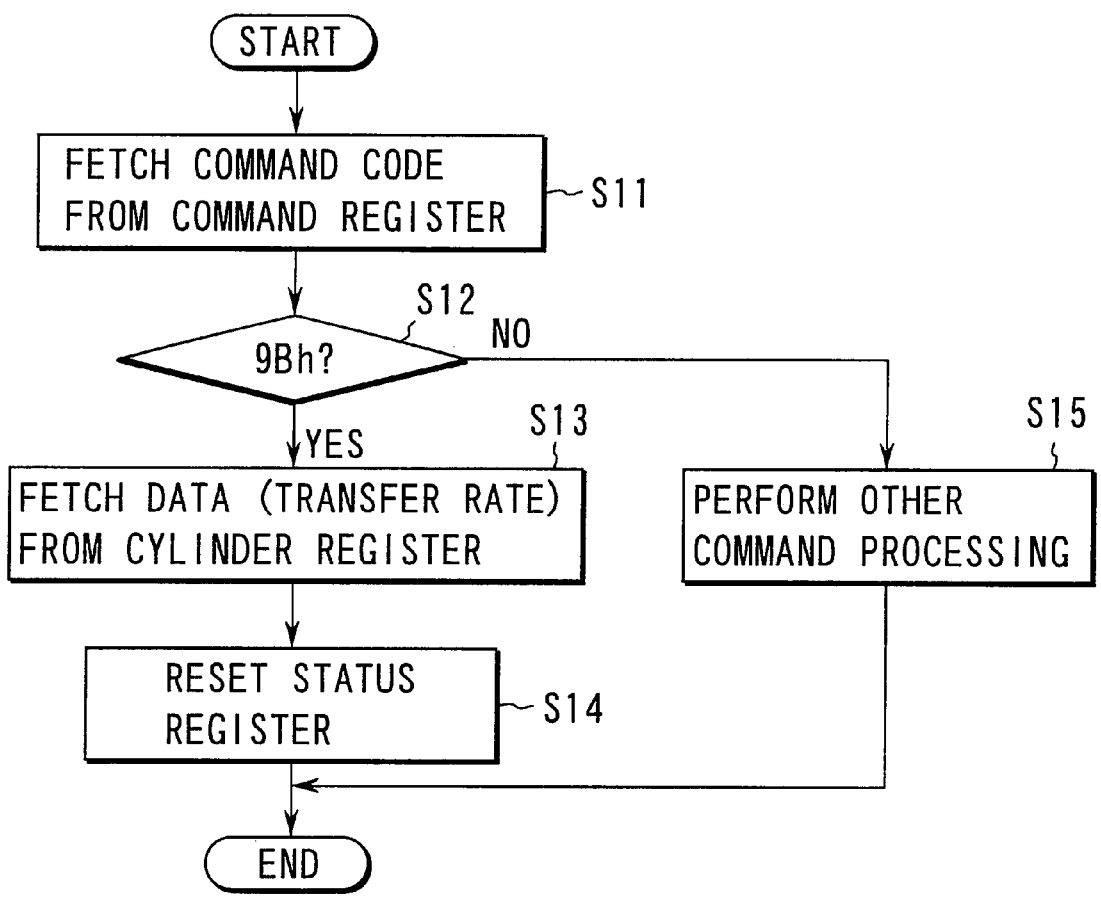
FIG. 6 is a flow chart explaining the process of setting an average speed of transferring data in response to a command in the disk drive.

As shown in FIG. 6, the CPU 12 accesses the command register 9A of the HDC 9, thereby fetching the command code from the register 9A (Step S11). Then, the CPU 12 determines whether the command code is 9B$h$ or not (Step S12). If YES in Step S12, the flow goes to Step S13, in which the CPU 12 fetches the average-speed data from the cylinder register 9B and stores the same into the RAM 13B or the EEPROM 13C. Then, the CPU 12 resets the status register 9F, clearing the BSY bit and informing the host system 11 that the command has been performed (Step S14).

If NO in Step S12, that is, if the command code stored in the command register 9A is an ordinary one (e.g., read command), the flow goes to Step S15. In Step S15, the ordinary command is performed.

Thus, the CPU 12 sets the lower limit of the average speed of transferring data. The average speed of transferring data, thus set, is the value obtained by the following method. First, it is calculated how much data can be transferred between the HDD and the host system 11 in accordance with a read/write command the host system 11 will issue after this command. Then, it is calculated how much time will elapse between the time the host system 11 issues the read/write command and the time the CPU 12 informs the host system 11 that the read/write command has been performed. Finally, the amount of data calculated is divided by the time calculated.

(Calculating the Maximum Time for Performing Command)

The CPU 12 calculates a maximum time available for performing a command, i.e., the time that elapses the start of performing the command and the time the CPU 12 informs the host system 11 that the command has been performed. That is, the maximum time is calculated from the average-speed data set from the host system 11 and the amount of data to be transferred in accordance with a read/write command the host system 11 will issue.

Assume that the average-speed data set is 100 KB/sec, that the amount to data to be transferred is 20 sectors of data, and that one sector of data is 512 bytes. Namely, the average speed of transferring data is (1000000/8) byte/sec, and the amount of data to be transferred is (512×20) bytes. Hence, the maximum time is 819.2 ms (=(512×20) bytes/(1000000/8) byte/sec). In this instance, the CPU 12 must perform a command issued from the host system 11 within 819.2 milliseconds from the issuance of the command. If the command is a read command, all data can be transferred from the HDD to the host system 11 within the maximum time thus calculated, at a speed lower than the average speed set from the host system 11.

(Monitoring of the Command-Performing Time)

Figure 7:
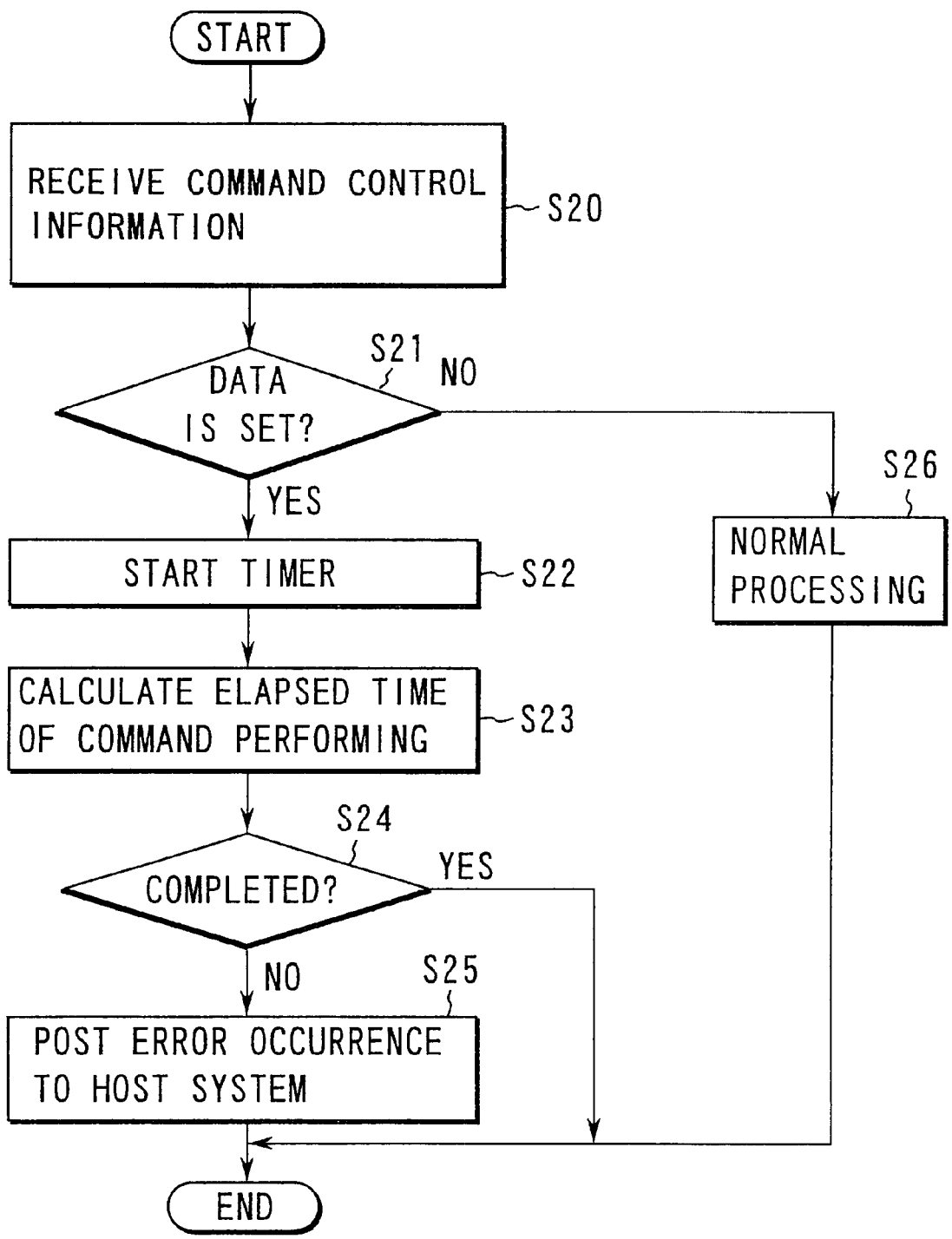
FIG. 7 is a flow chart explaining the process of monitoring the time being spent to perform a command in the disk drive.

The HDC 9 has a timer for measuring the time for performing the command. The HDC 9 can therefore detects how much time has passed from the start of performing the command. The process of monitoring the time will be explained with reference to the flow chart of FIG. 7.

The CPU 12 receives the command control information (Step S20). The CPU 12 then determines from the command control information whether that the limit time, within which each command must be performed, has been set from the host system 11 (Step S21). If NO in Step S21, it is unnecessary to monitor the time for performing the command. Therefore, the flow goes to Step S26, in which a normal processing is carried out.

If YES in Step S21, the flow goes to Step S22, in which the CPU 12 starts the timer provided in the HDC 9. The timer receives a clock signal from a clock signal generator (not shown). The count of the timer increases or decreases by one, every time a predetermined time elapses. From the count of the timer the CPU 12 calculates how much time has passed since the start of performing the command (Step S23). From the time thus calculated, the CPU 12 determines whether or not the command can be performed within the limit time that has been set (Step S24). If NO in Step S24, the CPU 12 causes the HDC 9 to generate an error message (Step S25). That is, the CPU 12 calculates the remaining time for performing the command, and the HDC 9 supplies an error message to the host system 11 if the remaining time is shorter than the limit time.

(Process of Monitoring the Command-Performing Time)

Figure 8:
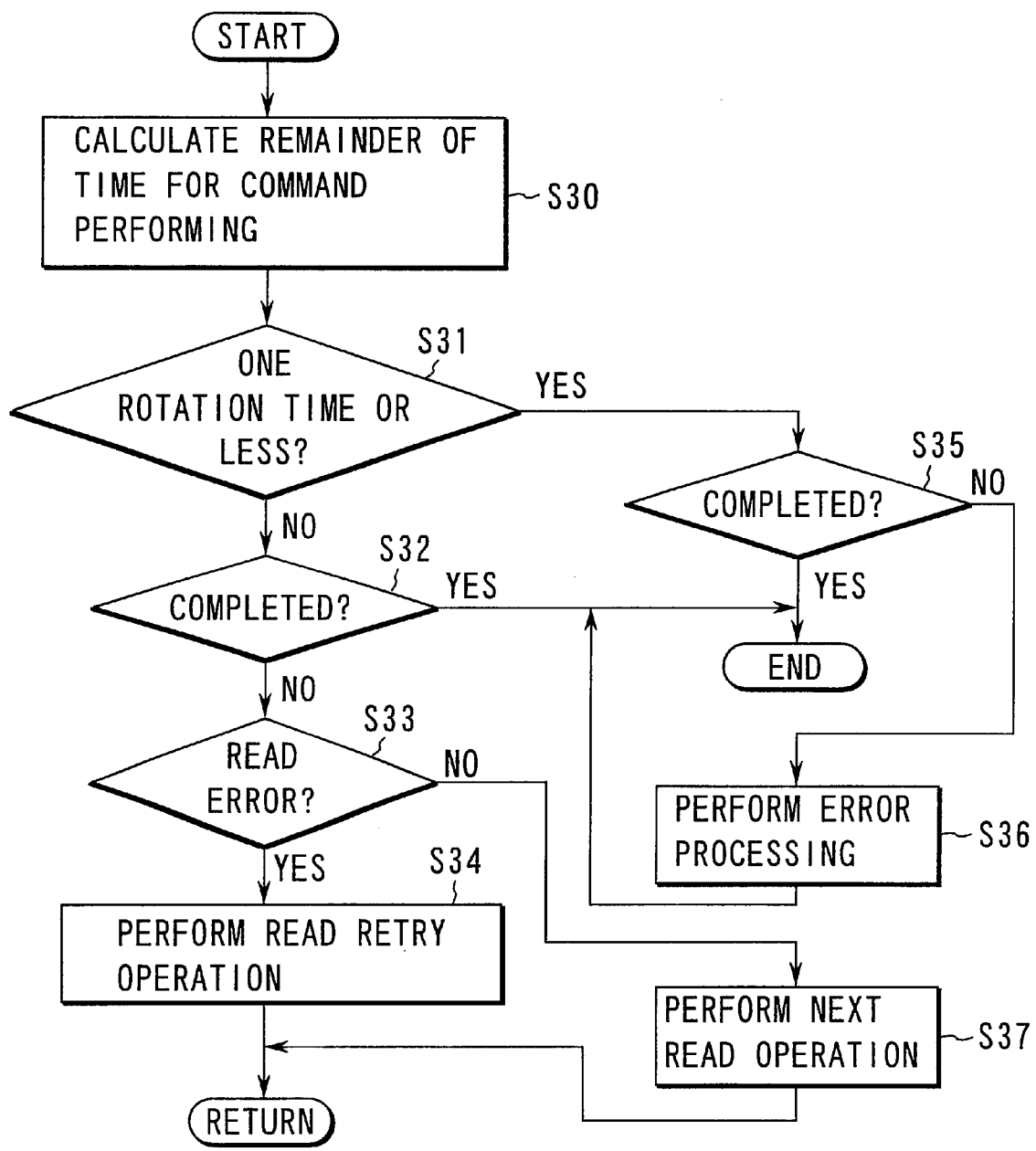
FIG. 8 is a flow chart explaining the process of monitoring the time being spend to perform a command.

The process of monitoring the time of performing the command will be explained in detail with reference to the flow chart of FIG. 8.

In this process, an error message is supplied to the host system 11 if the command cannot be performed in the remaining time, and processing is carried out if a read error occurs.

First, the CPU 12 calculates the remaining time for performing the command from the time that has passed since the start of performing the command (Step S30). Then, the CPU 12 determines whether or not the remaining time is equal to or shorter than the time that the disk 1 needs to rotate once (Step S31). If a read error occurs while the read command is being performed (that is, while data is being read from the disk 1), read retry is usually carried out (in Step S34 if YES in Step S33). In this case, a wait time almost equal to one-rotation time of the disk 1 is required to perform the read retry after the read error has been detected. The wait time is 14.2 ms if the disk 1 rotates at 4200 rpm. Hence, if the remaining time for performing the command is shorter than the wait time, a time longer than the remaining time may probably be required to perform the command completely even if the read try is successfully achieved. Therefore, the CPU 12 sends an error message to the host system 11 (in Step S35 if YES in Step S31 and NO in Step S35). A similar sequence of operations is performed in the case where the time for moving the read head 3 is monitored. If this is the case, the CPU 12 needs only to calculate the time for moving the read head to a desired position, from the distance the read head 3 has moved, and to compare the calculated time with the remaining time for performing the command.

If the remaining time for performing the command is longer than the one-rotation time of the disk 1, the flow goes to Step S32. In Step S32, the CPU 12 determines whether the data the host system 11 has requested for has been read completely or not. If YES in Step S32, the process of performing the read command is completed. If NO in Step S 32, the flow goes to Step S33. In Step S33, the CPU 12 determines whether a read error has occurred or not.

If YES in Step S33, that is, if a read error has occurred, the flow goes to Step S34, in which read retry is performed. If NO in Step S33, that is, if no read error has occurred, the flow goes to Step S37. In Step S37, data will be read from the next area of the disk 1 as is requested by the host system 11.

(Process of Complementing Data)

Figure 9:
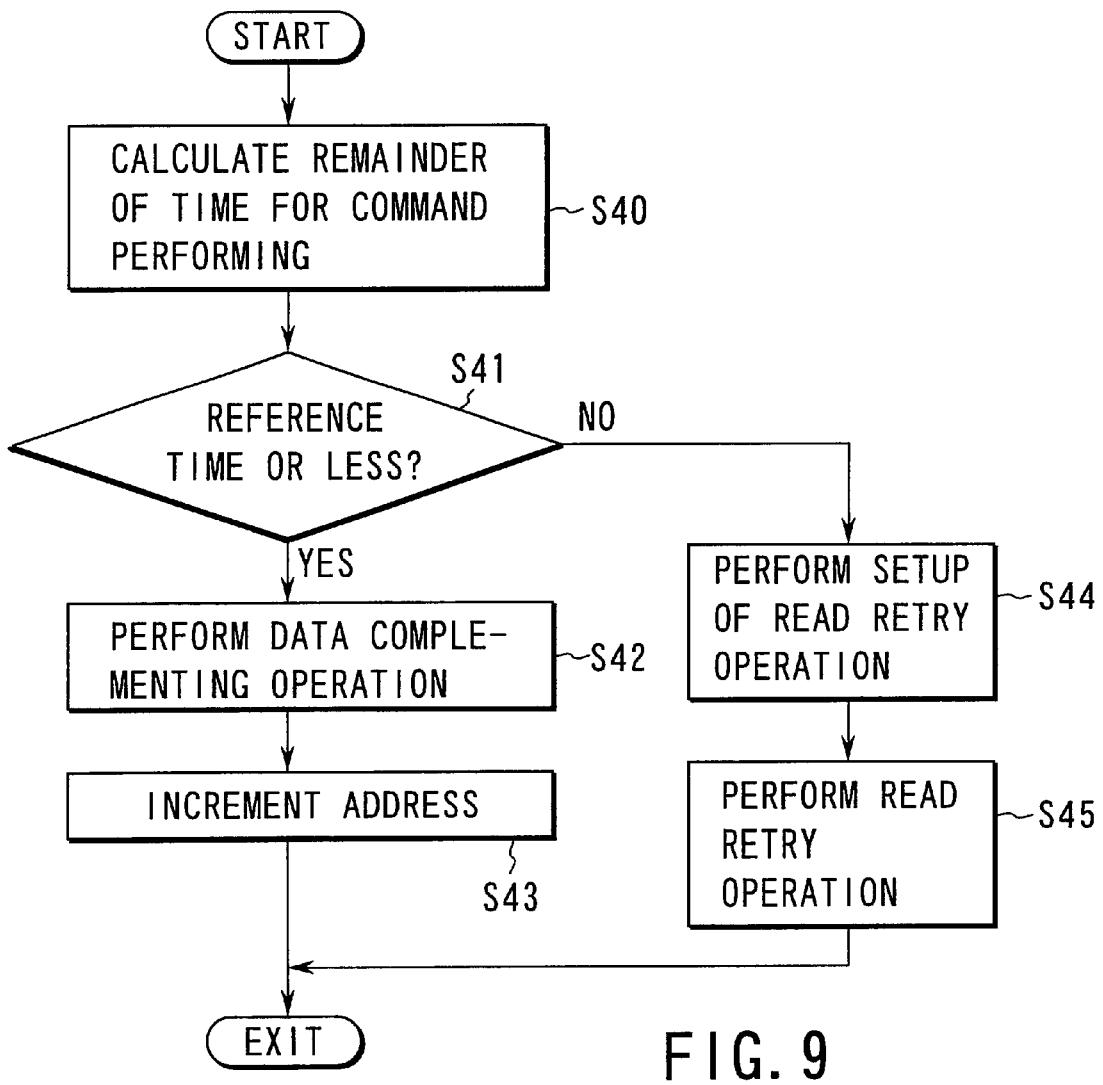
FIG. 9 is a flow chart explaining the process of complementing data in the disk drive.

The remaining time for performing the command may be shorter than a reference time Tth. In this case, the read retry is altered and the data is complemented. Even if the all data the host system has requested for is not transferred to the host system 11, the host system 11 can reproduce the continuous data, such as video data and audio data. If a read error occurs, the read retry is interrupted within the time of performing the read command, and data is read from the sector next to the sector where the read error has occurred is left, in order to read data with high efficiency. This process will be explained with reference to the flow chart of FIG. 9.

Assume that a read error occurs while data is being read from the desired sector on the disk 1 in accordance with a read command supplied from the host system 11.

First, the CPU 12 calculates the remaining time for performing the command (Step S40). Then, the CPU 12 determines whether the remaining time, thus calculated, is equal to or shorter than the reference time Tth (Step S41). If NO in Step S40, that is, if the remaining time is longer than the time Tth, the CPU 12 set up read retry (Step S44) and then perform the read retry (Step S45).

If YES in Step S41, that is, if the remaining time is equal to or shorter than the reference time Tth, the flow goes to Step S42. In Step S42, the CPU 12 does not perform read retry, but performs the process of complementing data, which will be described later. Then, the CPU 12 increments the access address by one (Step S43). In other words, the read/write operation at the sector where the error has occurred is interrupted, so that data may be read from the next sector.

In the process of complementing data, read retry is not repeated at a sector until data is read from the sector. Rather, read retry is no longer effected after the read retry has been repeated a predetermined number of times, and data is read from the next sector. Hence, the HDC 9 can transfer more data to the host system 11 within a prescribed time.

Assume that the host system 11 requests that audio data be read from 100 sectors and transferred to it. If a read error occurs in the course of reading data from the second sector, read retry is effected at the second sector. If the prescribed time has passes, with no data read from the second sector, the CPU 12 starts reading data from the third sector, i.e., the sector next to the sector where the read error has occurred.

The process of complementing data will now be explained, with reference to the flow chart of FIG. 10.

Figures 10, 11, 12:
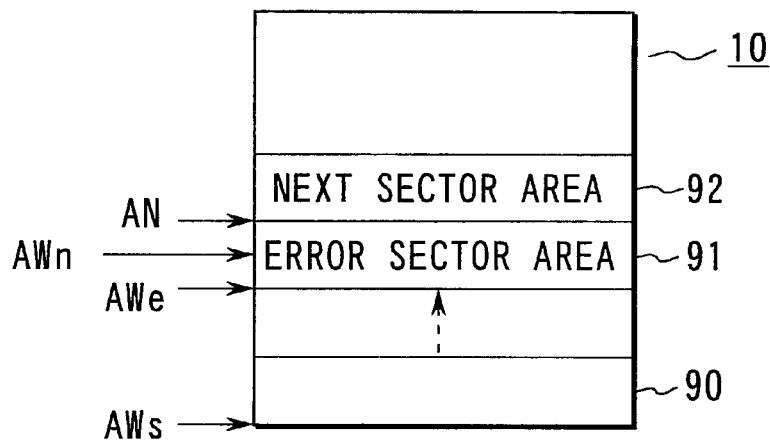

FIG. 10 illustrates the data stored in the sector buffer 10. As can be understood from FIG. 10, the data read from the disk 1, in units of sectors, is stored in the sector buffer 10, with an address AWs stored at the first memory location. The first sector of data read from the disk 1 is stored in the sector storage area 90. The data read from the sector where a read error has occurred is stored in the sector storage area 91. If data is normally read from a sector where a read error has occurred, 512 bytes of this data are stored in the sector storage area 91, at addresses Awe (e.g., 4000h to 41FFh). If data is not read from the sector, at which the read error has occurred, no data will be written into the sector buffer 10. Hence, the data-writing positions in the sector buffer 10 will not be changed at all. Thus, the next sector storage area 92 starts with the first address AN (4200h). Of the data (512 bytes) read from the sector where the read error has occurred, only the first 80 bytes may be stored into the sector buffer 10. If so, the next data item will be written at the address Awn (4050h).

That is, the CPU 12 interrupts the read retry at the sector where the read error has occurred.

To complement data, the CPU 12 maintains the sector storage area 91 in the present state and sets the first address AN (4200h), thus changing the data-writing position in the sector buffer 10. If only a part of the data is stored into the sector buffer 10 as is described above, the CPU 12 changes the first address to Awn (4050h), where at which the next data will be written.

The sector data containing the error, which the HDC 9 has subjected to ECC processing, may be stored in the sector storage area 91. Further, the CPU 12 may store specific data into the sector buffer 11. The specific data may be defined in the host system 11. From the specific data, the host system 11 can determine from the specific data that the reading of data from the sector has been interrupted because a read error has occurred at the sector.

In the case where data can be complemented for any data that cannot be transferred to the host system 11, the process of complementing data may be carried out, without spending much time to read the data from the disk 1.

The typical example of spending much time is to make an access to the sector substituted for the sector where a read error has occurred. To access the substitute sector, the read head 3 must be moved to the substitute sector to read data therefrom. Since it takes some time to move the head 3 to the substitute sector, the process of complementing data is desirable particularly when the remaining time for performing the read command has become short. The data-complementing process makes it possible to transfer more data to the host system 11 within the limited time of performing the read command.

There is a type of an HDD which performs an automatic sector-substituting function. This function is to substitute a sector for any sector at which read retry has been repeated or effected in a specific manner to read data, on the assumption that a read error will occur at the sector when an access is made to the sector. The automatic sector-substituting function works in the data-writing operation, too. More precisely, if data cannot be written in the desired sector, the sector is automatically substituted by another, in which the data is written. However, it takes much time to substitute a flawless sector for a defective sector.

Needless to say, a sector-substituting function need not be performed in the HDD according to the present invention. In the HDD of the invention, in which the data-compensating process is carried out, thereby transferring more data to the host system 11 within the limited time of performing the read command.

(How to Calculate the Number of Read Retries can be Repeated)

As indicated above, read retry is effected at any sector where an error has occurred. The read retry is repeated if the error remains at the sector, until the remaining time for performing the command becomes equal supplied to the host system 11.

(How to Determine the Remaining Time for Performing the Command)

As mentioned above, the remaining time for performing the command can be determined from the time the disk 1 requires to rotate once. Instead, the remaining time can be determined from the time required to repeat the read retry, the time required to move the head to the track having the target sector, or the time required to transfer data from the HDD to the host system 11.

(Modification of the Embodiment)

A modification of the embodiment described above will be explained with reference to FIGS. 11 to 21.

(How to Specify the Average Speed of Transferring the Command Issued Last)

FIG. 11 shows the data stored in the registers provided in the HDC 9 of the IDE interface specification. The data is a command for obtaining the average speed of transferring the last command the host system 11 has issued.

In the modified HDD, the average speed of transferring the last command is stored in the cylinder register 9B, in unit of, for example, 1 KB/sec. This makes it possible to specify to the host system 11 how fast the HDD can transfer commands to the host system 11, together with data. More precisely, a specific to or shorter than the reference time Tth. Consequently, a part of the disk 1, which has been designated by the host system 11, is accessed again and again. That is, all sectors of the disk 1 designated by the host system 11 are not equally accessed.

It is desirable to access the sectors equally by the following method. First, the number of times the read retry can be effected at each sector is predetermined. If a read error occurs at a sector, sectors are counted from the first one of the sectors that should be accessed, the one where the last error has occurred, the leading edge of the track having the sector where last error has occurred, or the position in the track where the last error has occurred. The number of sectors, thus counted, is divided by the predetermined number of times the read retry can be effected. The integer part of the quotient is used as the number of times the read retry can be repeated.

For example, if the number of times the read retry can be effected at each sector is 0.5 and if the host system 11 designates 40 sectors that should be accessed, the read retry can be effected 20 times in total. Assume that an error occurs at the fifth of the 40 sectors. Then, the average number of times the read retry should be repeated is 2.5 (=5×0.5). Hence, if no data is read from the fifth sector even after the read retry has been made two times, an error message is code 9C is set in the command register 9A.

(How to Specify the Time of Performing the Command Issued Last)

FIG. 12 shows the data stored in the registers provided in the HDC 9 of the IDE interface specification. The data is a command for obtaining the time of performing the last command the host system 11 has issued.

In the modified HDD, the time of performing the last command the host system 11 has issued is stored in the cylinder register 9B, in unit of, for example, milliseconds (ms). This makes it possible to specify to the host system 11 the time within which the HDD can perform the command. More specifically, a specific code 9D is set in the command register 9A.

(How to Specify the Average Speed of Transferring Data Processed by Commands Performed in a Specific Period)

FIG. 13 shows the data stored in the registers provided in the HDC 9 of the IDE interface specification. The data is a command (specific code 9E) for initiating the measuring the average speed of transferring data processed by the commands performed within a specific period.

Figures 19A, 19B:
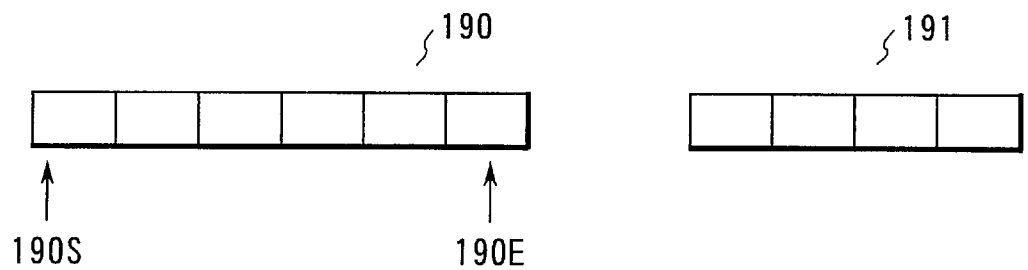
FIGS. 19A, 19B and 20 are diagrams for explaining the operation of the modified disk drive.

FIG. 14 shows the data stored in the registers provided in the HDC 9. This data is a command (specific code 9F) for terminating the measuring the average speed of transferring the data processed by the commands performed in the specific period. It should be noted that the commands for processing data are stored between the specific codes 9E and 9F. Namely, as shown in FIG. 19A, the commands 190 recorded between the command 190S for initiating the measuring and the command 190E for terminating the measuring. And the average speed of transferring the commands 190 is determined by the method explained with reference to FIG. 11. Thus, the HDD can specify to the host system 11 how fast the HDD can perform the commands 190. FIG. 19B shows the commands, the average transfer speed of which is not measured.

(How to Specify the Time of Performing the Commands Performed in a Specific Period)

FIG. 15 shows the data stored in the registers provided in the HDC 9 of the IDE interface specification. The data is a command (specific code A0) for initiating the measuring the average speed of transferring data processed by the commands performed within a specific period.

FIG. 16 shows the data stored in the registers provided in the HDC 9. This data is a command (specific code A1) for terminating the measuring the average speed of transferring the data processed by the commands performed in the specific period. It should be noted that the commands for processing data are stored between the specific codes A0 and A1. That is, as shown in FIG. 19A, the commands 190 recorded between the command 190S for initiating the measuring and the command 190E for terminating the measuring. And the average speed of transferring the commands 190 is determined by the method explained with reference to FIG. 12. Thus, the HDD can specify to the host system 11 how fast the HDD can perform the commands 190.

(Method of Predicting the Data Transfer Speed)

In the HDC 9 of the IDE interface specification, provided in the modified HDD, the average speed of transferring commands is obtained as is desired by the host system 11. Actually, the modified HDD does not transfer data to the host system 11. Nonetheless, it predicts the average speed at which data will be transferred to the host system 11 if the disk 1 incorporated in the HDD is flawless and if data is read from the disk 1. The sectors to access are designated by the data stored in the cylinder register, drive/head register, sector number register and sector count register. The command code for verifying the disk 1 is thereby designated, in the same way as the read command. Thus, data is read from the disk 1, without using the data buffer provided in the host system 11. The average data transfer speed obtained by this method is a value predicted for the speed at which data is transferred when the command is performed. This is because the speed of transferring data from the HDD to the host system 11 is much higher than the speed of reading data from the disk 1.

(Method of Predicting the Time of Performing the Command)

In the HDC 9 of the IDE interface specification, provided in the modified HDD, the time of performing a command that involves the transfer of data is predicted, as is desired by the host system 11. Actually, the modified HDD does not transfer data to the host system 11. Nonetheless, it predicts the time for which data will be read from the disk 1 incorporated in the HDD if the disk 1 incorporated in the HDD is flawless and if data is read from the disk 1. The sectors to access are designated by the data stored in the cylinder register, drive/head register, sector number register and sector count register. The command code for verifying the disk 1 is thereby designated, in the same way as the read command. Thus, data is read from the disk 1, without using the data buffer provided in the host system 11. The time of performing the command, obtained by this method, is a value predicted for the time which will be required when the command is performed. This is because the speed of transferring data from the HDD to the host system 11 is much higher than the speed of reading data from the disk 1.

(Read Cache Operation for Guaranteeing a Transfer Rate)

Figure 20:
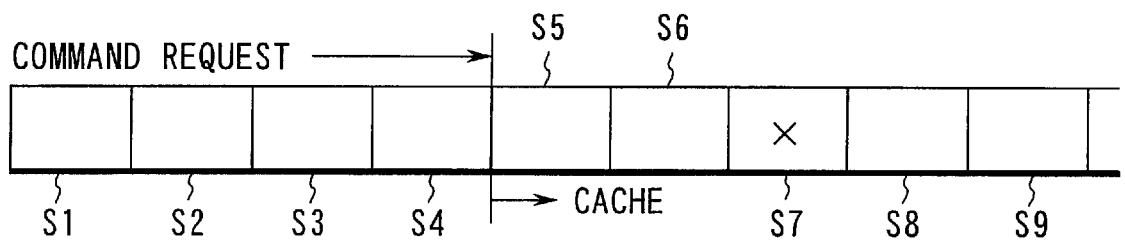

FIG. 20 explains how the modified HDD reads data from the disk 1, while transferring data at the average speed the host system 11, in the case where read retry must be effected. Generally, an HDD starts reading data from some sectors of a disk which will probably be designated by the host system, before the host system 11 issues a read command. The data read from these sectors is saved in the sector buffer 10 incorporated in the HDD. (This process is known as "read cache operation" or "pre-reading process.") In the modified HDD of this invention, the average data transfer speed demanded by the host system 11 is guaranteed. To this end, if an error occurs at a sector S7 as shown in FIG. 20 and read retry must therefore be effected at the sector S7, data is read from the sectors of the same track, which follow the sector S7, before data is read from the sector S7.

Figure 21:
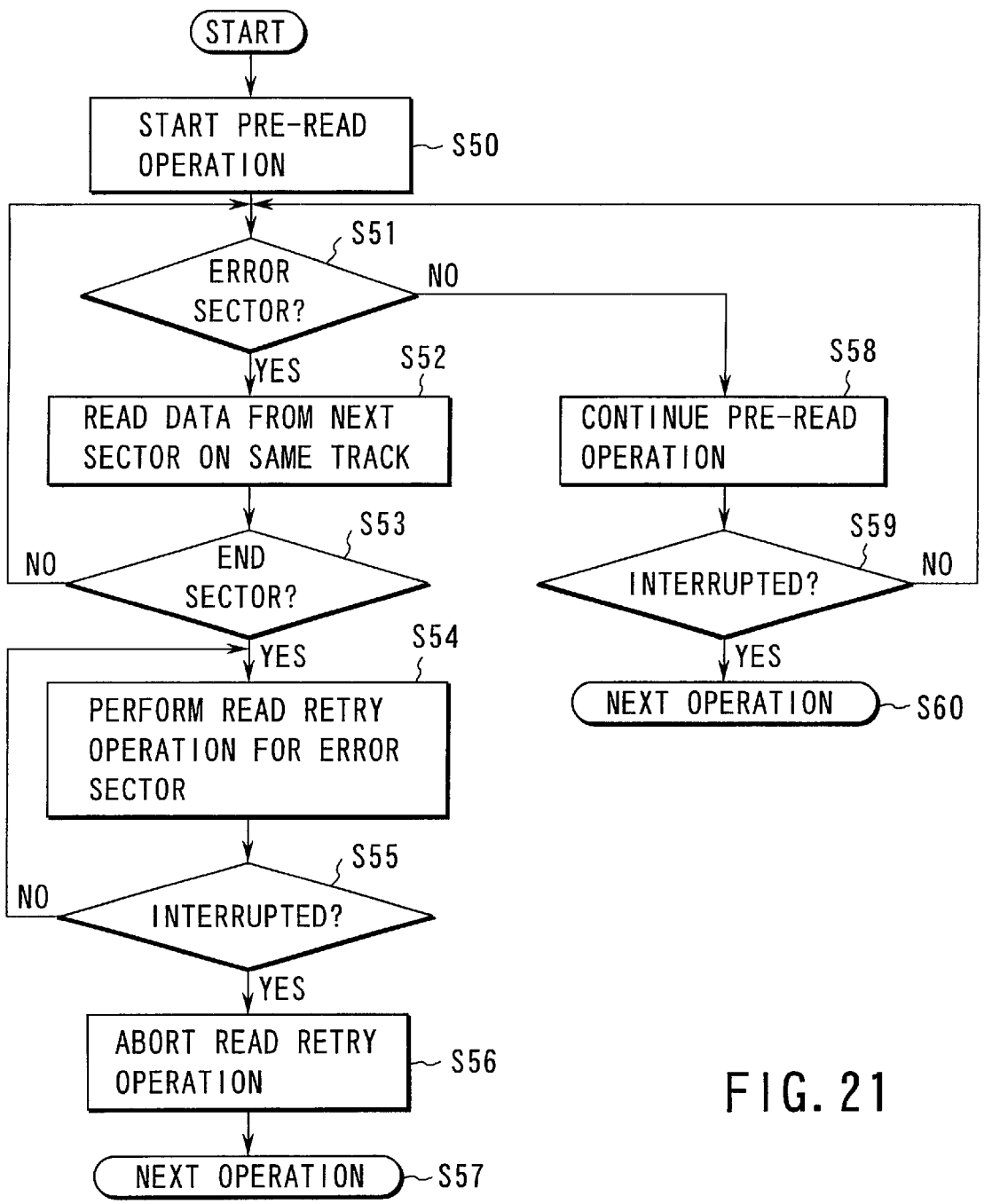
FIG. 21 is a flow chart explaining the operation of the modified disk drive.

The read cache operation will be described in detail, with reference to the flow chart of FIG. 21.

First, the data-reading operation is started at sectors S5 to S9 to be stored into a read cache as shown in FIG. 20, before reading data from the sectors designated by the host system 11 (Step S50). It is determined whether or not an error occurred at the sectors S5 to S9 (Step S51). If NO in Step S51, the pre-reading process is continued (Step S58). Then it is determined whether or not the pre-reading process is interrupted (Step S59). If YES in Step S59, the next operation is performed. If NO in Step S59, the flows returns to Step S51.

If YES in Step S51, that is, if an error occurred at, for example, the sector S7, the CPU 12 starts the data-reading operation at the next sector S8 on the same track (Step S52). Then, the CPU determines whether or not data has been read from the last sector S9 (Step S53). When the disk 1 finishes rotating once, read retry is carried at the sector S7 (Step S54). The read retry is repeated as long as the host system 11 issues no commands for interrupting the data-reading operation, such as a read command. The CPU 12 determines whether the data-reading operation has been interrupted or not (Step S55). If YES in Step S55, the CPU 12 aborts the read retry (Step S56). Then, the CPU 12 starts ordinary read/write operation, in response to the command supplied from the host system 11 (Step S57).

The read cache operation may be conducted in a different way. For example, a specific code A2 as is shown in FIG. 17 is set as a command, and the read retry is repeated at the sector where an error has occurred, as many times as possible, so as to transfer normal data to the host system 11. The read cache operation may be conducted in an alternative method. In this method, a specific code A3 as is shown in FIG. 18 is set as a command. Then, the read retry operation at the sector where an error has occurred is interrupted, and data (containing errors) read from the sector is transferred to the host system 11. The transfer rate demanded by the host system 11 is thereby guaranteed.

Thus, normal data can be transferred to the host system 11 or the high transfer rate can be maintained, by setting either the code A2 or the code A3 as a command. In the case where the high transfer rate is maintained, rather than transmitting normal data, the transfer of specific data and the data-complementing process may be performed, along with the transfer of the error-containing data.

As has been described, with the present invention it is possible to finish performing a command within the period between the time the host system issues the command and the time the host system issues the next command. This enables the host system to operate normally at all times. With the invention it is also possible to change the modes of the read retry, data-complementing process, read cache operation and error-notifying operation in accordance with the command control information. Thus, commands can be performed in compliance with the operating characteristic of the host system. To be more specific, continuous data such as video data can be reproduced, not only within the limited time of performing a command, but also in the data-reproducing mode designated by the host system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
   a disk for recording data requested for by a host system connected to the disk drive;
   read/write means for reading data from and writing data on the disk, in accordance with a read/write command supplied from the host system;
   means for holding command control information for controlling a process of performing the command supplied from the host system and a specific command for setting the command control information; and
   control means for setting the command control information in accordance with the specific command and for controlling the process of performing the read/write command in accordance with the command control information.

2. A disk drive according to claim 1, wherein the command control information contains time-limiting data for limiting a limited time within which the command supplied the host system should be performed and data should thereby be transferred to the host system, and the control means controls the process of performing the read/write command in accordance with the time-limiting data, within a time limited by the time-limiting data.

3. A disk drive according to claim 1, wherein the command control information contains time-limiting data which limits a time for performing the command supplied from the host system, and the control means controls the process of performing the read/write command in accordance with the time-limiting data, to finish performing the read/write command within a period between the time when the host system issues the read/write command and the time when the host system issues the next read/write command.

4. A disk drive comprising:
   a disk for recording data requested for by a host system connected to the disk drive;
   read/write means for reading data from and writing data on the disk, in accordance with a command supplied from the host system;
   means for holding command control information for controlling a process of performing the command supplied from the host system and a specific command for setting the command control information; and
   control means for setting the command control information in accordance with the specific command and for controlling the process of performing the read/write command in accordance with the command control information, wherein the command control information defines an average data transfer speed calculated from an amount of data transferred as the read/write command is performed, and the control means controls the process of performing the read/write command to transfer data at a speed equal to or lower than the average data transfer speed.

5. A disk drive comprising:
   a disk for recording data requested for by a host system connected to the disk drive;
   read/write means for reading data from and writing data on the disk, in accordance with a command supplied from the host system;
   means for holding command control information for controlling a process of performing the command supplied from the host system and a specific command for setting the command control information; and
   control means for setting the command control information in accordance with the specific command and for controlling the process of performing the read/write command in accordance with the command control information, wherein the command control information defines an upper limit of the time for performing the command, which has been calculated from an amount of data transferred as the read/write command is performed, and the control means controls the process of performing a plurality of commands continuously thereby to finish performing each command within the upper limit of the time.

6. A disk drive comprising:
   a disk for recording data requested for by a host system connected to the disk drive;
   read/write means for reading data from and writing data on the disk, in accordance with a command supplied from the host system;
   means for holding command control information for controlling a process of performing the command supplied from the host system and a specific command for setting the command control information; and control means for setting the command control information in accordance with the specific command and for controlling the process of performing the read/write command in accordance with the command control information, wherein the command control information is time data obtained by dividing a period between the time when the host system issued a command and the time when data is normally transferred as the command is performed, by an average data transfer speed calculated from an amount of data transferred as the read/write command is performed.

7. A disk drive comprising:

a disk for recording data requested for by a host system connected to the disk drive;

read/write means for reading data from and writing data on the disk, as a read/write command supplied from the host system is performed;

means for holding command control information for limiting a time for performing the command supplied from the host system and a specific command for setting the command control information;

time-monitoring means for monitoring a time that has elapsed from the time when the host system issued the command; and control means for setting the command control information in accordance with the specific command and for controlling a process of performing the read/write command in accordance with the time monitored by the time monitoring means, thereby to finish performing the command within the time limited by the command control information.

8. A disk drive according to claim 7, wherein the command control information contains time data representing a limited time within which the command supplied the host system should be performed and data should thereby be transferred to the host system, and the control means controls the process of performing the read/write command in accordance with the time data, within a the time limited by the time-limiting data.

9. A disk drive according to claim 7, wherein the control means calculates a remaining time for performing the command, on the basis of the limited time and the time monitored by the time-monitoring means, and supplies an error message to the host system when a process cannot be performed within the remaining time thus calculated.

10. A disk drive according to claim 7, wherein the read/write means performs read retry when a read error occurs while data is being read from the disk in accordance with a read command supplied from the host system, and the control means calculates a remaining time for performing the read command, on the basis of the limited time and the time monitored by the time-monitoring means, and interrupts the read retry when the read retry cannot be performed within the remaining time thus calculated.

11. A disk drive according to claim 7, wherein the read/write means performs read retry when a read error occurs while data is being read from the disk in accordance with a read command supplied from the host system, and the control means calculates a remaining time for performing the read command, on the basis of the limited time and the time monitored by the time-monitoring means, and performs a data-complementation process when the remaining time calculated is equal to or shorter than a prescribed time and a read error occurs while the data is being read from the disk.

12. A disk drive according to claim 11, wherein the data-complementing process comprises a steps of interrupting the transfer of data containing an error, and a step of transferring only normal data to the host system within the prescribed time.

13. A disk drive according to claim 7, wherein the read/write means performs read retry when a read error occurs while data is being read from the disk in accordance with a read command supplied from the host system, and the control means calculates a remaining time for performing the read command, on the basis of the limited time and the time monitored by the time-monitoring means, and limits the number of times the read retry is repeated, when the remaining time calculated is equal to or shorter than a prescribed time and a read error occurs while the data is being read from the disk.

14. A disk drive comprising:

a disk for recording data requested for by a host system connected to the disk drive;

read/write means for reading data from and writing data on the disk, as a read/write command supplied from the host system is performed;

means for holding command control information for controlling transfer of data to and from the host system, which accompanies the performing the read/write command, and a specific command for setting the command control information; and control means for setting the command control information in accordance with the specific command and for controlling a process of performing the read/write command, thereby to finish performing the command within a time represented by data contained in the command control data, said time starting when the host system issues the read/write command.

15. A disk drive according to claim 14, wherein the command control information contains data representing a data transfer rate, and the control means controls the process of performing the command, thereby to transfer data at the data transfer rate.

16. A disk drive comprising:

a disk for recording data requested for by a host system connected to the disk drive;

read/write means for reading data from and writing data on the disk, as a read/write command supplied from the host system is performed;

means for holding command control information for controlling transfer of data to and from the host system, which accompanies the performing the read/write command, and a specific command for setting the command control information; and control means for setting the command control information in accordance with the specific command and for controlling a process of performing the read/write command, thereby to finish performing the command within a time represented by data contained in the command control data, said time starting when the host system issues the read/write command, wherein the command control information contains data representing a limited time for performing a command, and the control means perform read retry within the limited time when an read error occurs while data is being read in accordance with a read command issued from the host system, thereby to transfer as much data as is possible, as has been requested by the host system.

17. A disk drive comprising:

a disk for recording data requested for by a host system connected to the disk drive;

read/write means for reading data from and writing data on the disk, as a read/write command supplied from the host system is performed;

buffer memory for temporarily storing data read from the disk by means of the read/write means, before the data is transferred to the host system; and control means for controlling the read/write means while the host system is issuing no read/write commands, thereby to read data from continuous sectors on the disk and store the data into the buffer memory, for performing read retry at any one of the sectors, at which a read error has occurred in the course of reading data from the sectors, after the read/write means finishes reading data from all continuous sectors, and for interrupting the read retry when the host system issues the command.

18. A disk drive according to claim 17, which further comprises means for holding a specific command for performing the read retry and transferring data to the host system, and in which the control means controls the read retry while the read/write means is reading data from continuous sectors.

19. A method of performing, in a disk drive, commands issued from a host system, the method comprising the steps of:

holding command control information for controlling a process of performing the command supplied from the host system and a specific command for setting the command control information;

setting the command control information in accordance with the specific command; and controlling the process of performing the read/write command in accordance with the command control information.

20. A method of controlling read retry in a disk drive, the method comprising the steps of:

reading data from continuous sectors on a disk and storing the data into a buffer memory while the host system is issuing no read/write commands;

continuously reading data from all of the continuous sectors even if a read error occurs at any of the continuous sectors in the course of reading data from the sectors, without performing read retry at any sector where the read error has occurred;

performing the read retry at any sector where the read error has occurred, after data has been read from all continuous sectors; and interrupting the read retry when the host system issues the command in the course of performing the read retry.

* * * * *